(12) United States Patent
Kim et al.

(10) Patent No.: US 8,615,149 B2
(45) Date of Patent: Dec. 24, 2013

(54) PHOTONICS CHIP WITH EFFICIENT OPTICAL ALIGNMENT AND BONDING AND OPTICAL APPARATUS INCLUDING THE SAME

(75) Inventors: Do Won Kim, Daejeon (KR); Gyungock Kim, Daejeon (KR); JunYeong Lee, Pohang (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 216 days.

(21) Appl. No.: 13/190,403

(22) Filed: Jul. 25, 2011

(65) Prior Publication Data

US 2012/0121218 A1    May 17, 2012

(30) Foreign Application Priority Data

Nov. 15, 2010   (KR) .................. 10-2010-0113495

(51) Int. Cl.
   *G02B 6/00*     (2006.01)
   *G02B 6/12*     (2006.01)
   *G02B 6/36*     (2006.01)
   *H01R 43/16*    (2006.01)

(52) U.S. Cl.
   USPC .......................................... 385/49; 385/92

(58) Field of Classification Search
   USPC ......... 385/14–16, 147, 47, 50, 88–93; 29/874
   See application file for complete search history.

(56) References Cited

U.S. PATENT DOCUMENTS

| 7,162,124 | B1   | 1/2007  | Gunn, III et al. |
| 7,366,380 | B1 * | 4/2008  | Peterson et al. ................ 385/47 |
| 7,559,702 | B2 * | 7/2009  | Fujiwara et al. ................ 385/88 |
| 8,083,418 | B2 * | 12/2011 | Fujiwara et al. ................ 385/92 |
| 8,317,411 | B2 * | 11/2012 | Fujiwara et al. ................ 385/92 |

FOREIGN PATENT DOCUMENTS

KR      1020050074417 A      7/2005

OTHER PUBLICATIONS

Cary Gunn, "Fully Integrated VLSI CMOS and Photonics", 2007 Symposium on VLSI Technology Digest of Technical Papers, 2007, pp. 6-9.
Alexander W. Fang et al., "A distributed feedback silicon evanescent laser", Optics Express, Mar. 31, 2008, pp. 4413-4419, vol. 16, No. 7, OSA.

* cited by examiner

*Primary Examiner* — Akm Enayet Ullah (57) ABSTRACT

Provided are a photonics chip and an optical apparatus including the same. The chip may include a substrate, an optical waveguide, an optical coupler, and a plurality of alignment units. The optical waveguide is formed on the substrate. The optical coupler is formed at the optical waveguide. The alignment units align an optical connector which fixes at least one optical fiber coupled to the optical coupler, on the substrate.

17 Claims, 8 Drawing Sheets

PHOTONICS CHIP WITH EFFICIENT OPTICAL ALIGNMENT AND BONDING AND OPTICAL APPARATUS INCLUDING THE SAME

CROSS-REFERENCE TO RELATED APPLICATIONS

This U.S. non-provisional patent application claims priority under 35 U.S.C. §119 of Korean Patent Application No. 10-2010-0113495, filed on Nov. 15, 2010, the entire contents of which are hereby incorporated by reference.

BACKGROUND OF THE INVENTION

The present invention disclosed herein relates to an optical apparatus, and more particularly, to a photonics chip and an optical apparatus having the same.

Optical communication technologies have great potential in terms of being able to transmit high volumes of data at high speed, which is required in IT-oriented society. From thereamong, silicon photonics technology can be used to implement an optical communication system. However, due to the material properties of silicon, silicon photonics are limited, for example, in that silicon photonic light emitting devices cannot be fabricated in monolithic form together other photoelectric devices. An optical connector connected to an external light source is essential for light emitting devices. However, typical photonics chips have the limitations of low alignment efficiency and reduced optical bonding reliability when bonded to an optical connector.

SUMMARY OF THE INVENTION

The present invention provides a photonics chip and an optical apparatus including the same, which increase optical alignment efficiency.

The present invention also provides a photonics chip and an optical apparatus including the same, which increase optical bonding reliability.

Embodiments of the present invention provide a photonics chip including: a substrate; an optical waveguide formed on the substrate; an optical coupler formed on the optical waveguide; and a plurality of alignment units aligning an optical connector which fixes at least one optical fiber coupled to the optical couplers, on the substrate.

In some embodiments, the alignment units may include a plurality of solder balls formed on the substrate.

In other embodiments, the solder balls may be formed at both sides of the optical coupler.

In still other embodiments, the solder balls and the optical couplers may be formed on the same line.

In even other embodiments, the optical connector may include a plurality of holes into which the solder balls are inserted.

In yet other embodiments, the alignment units may further include a plurality of pads disposed in at least one of an upper portion and lower portion of the solder balls.

In other embodiments of the present invention, an optical apparatus includes: an optical fiber; an optical connector fixing the optical fiber; and a photonics chip comprising an optical coupler connected to the optical fiber, an optical waveguide connected to the optical coupler, a substrate comprising the optical waveguide, and a plurality of alignment units aligning the optical connector on the substrate.

In some embodiments, the optical connector may include at least one ferrule aligning the optical fiber, and a block surrounding the at least one ferrule.

In other embodiments, the at least one ferrule may include an upper ferrule and a lower ferrule.

In still other embodiments, each of the upper and lower ferrules may include a plurality of first holes through which the optical fibers pass, and a plurality of second holes formed outside the first holes.

In even other embodiments, the first holes may be inclined at an angle of about 0 to about 50 degrees with respect to a direction perpendicular to the substrate.

In yet other embodiments, the second holes may be perpendicular to the substrate.

In further embodiments, the alignment units may be inserted into the second holes.

In still further embodiments, the optical apparatus may further include a plurality of guide pins inserted into the second holes on the alignment units.

In even further embodiments, the second holes may include a trench into which the guide pins are inserted at an upper portion of the lower ferrule.

In yet further embodiments, the lower ferrule may have a flat surface supporting the alignment units at a lower portion of the second holes.

In much further embodiments, the photonics chip and the optical connector may be flip-chip bonded by the alignment units.

In still much further embodiments, the block may fix the upper and lower ferrules in parallel.

In even much further embodiments, the block may include a plurality of housing frames fixing the upper and lower ferrules to be inclined with respect to the substrate, a plurality of connection frames connecting the housing frame, and a plurality of ferrule fixing frames supporting the upper and lower ferrules in the housing frames.

In yet much further embodiments, the ferrule fixing frames may separate the upper ferrule from the lower ferrule in parallel.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

In the following description, the technical terms are used only for explain a specific exemplary embodiment while not limiting the present invention. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components. Since preferred embodiments are provided below, the order of the reference numerals given in the description is not limited thereto. It will be understood that when an element such as a layer, film, region, or substrate is referred to as being "on" another element, it can be directly on the other element or intervening elements may also be present.

Figure 1:
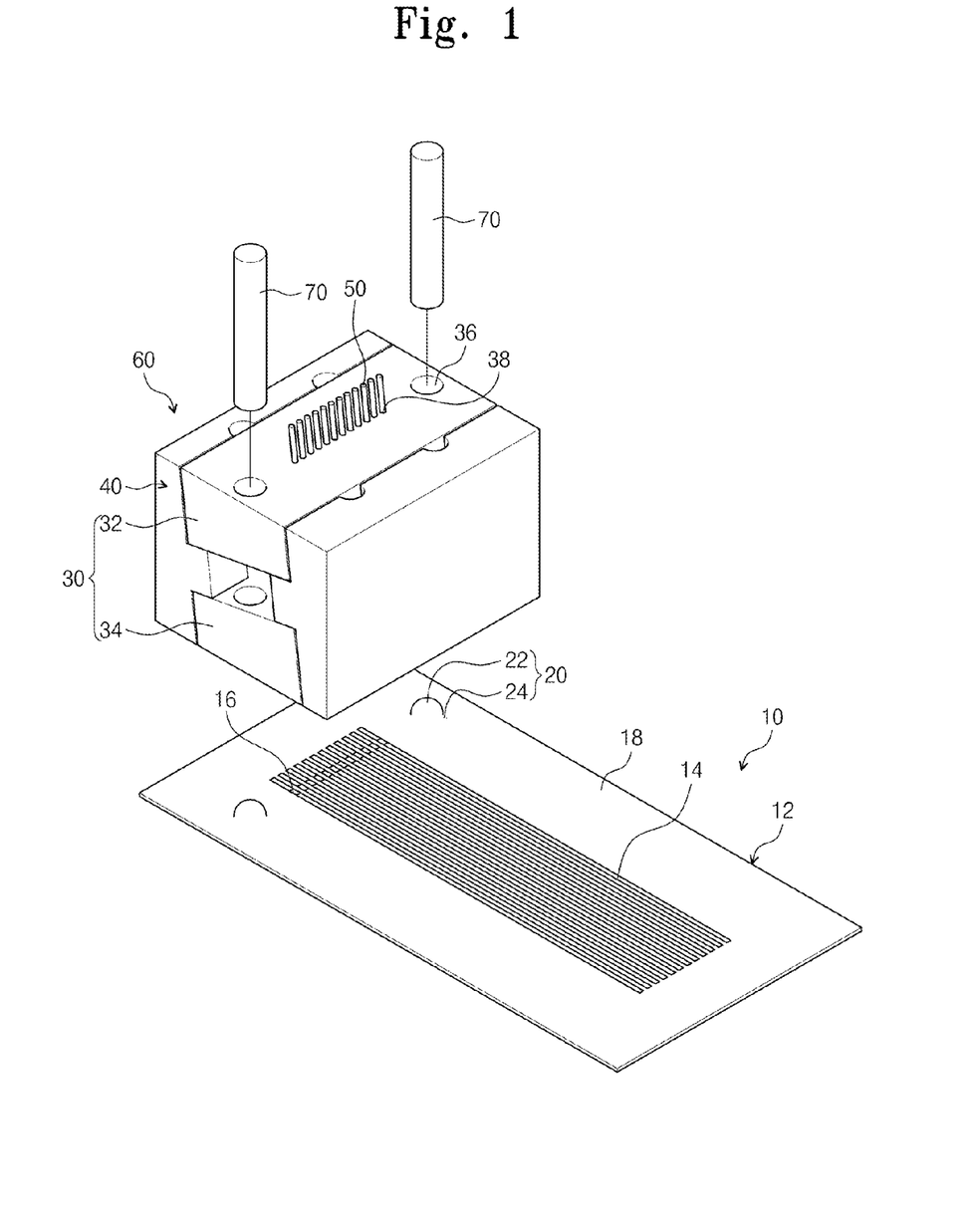
FIGS. 1 and 2 are exploded and assembled perspective views illustrating an optical apparatus including an optical connector according to an embodiment of the present invention.
Figure 2:
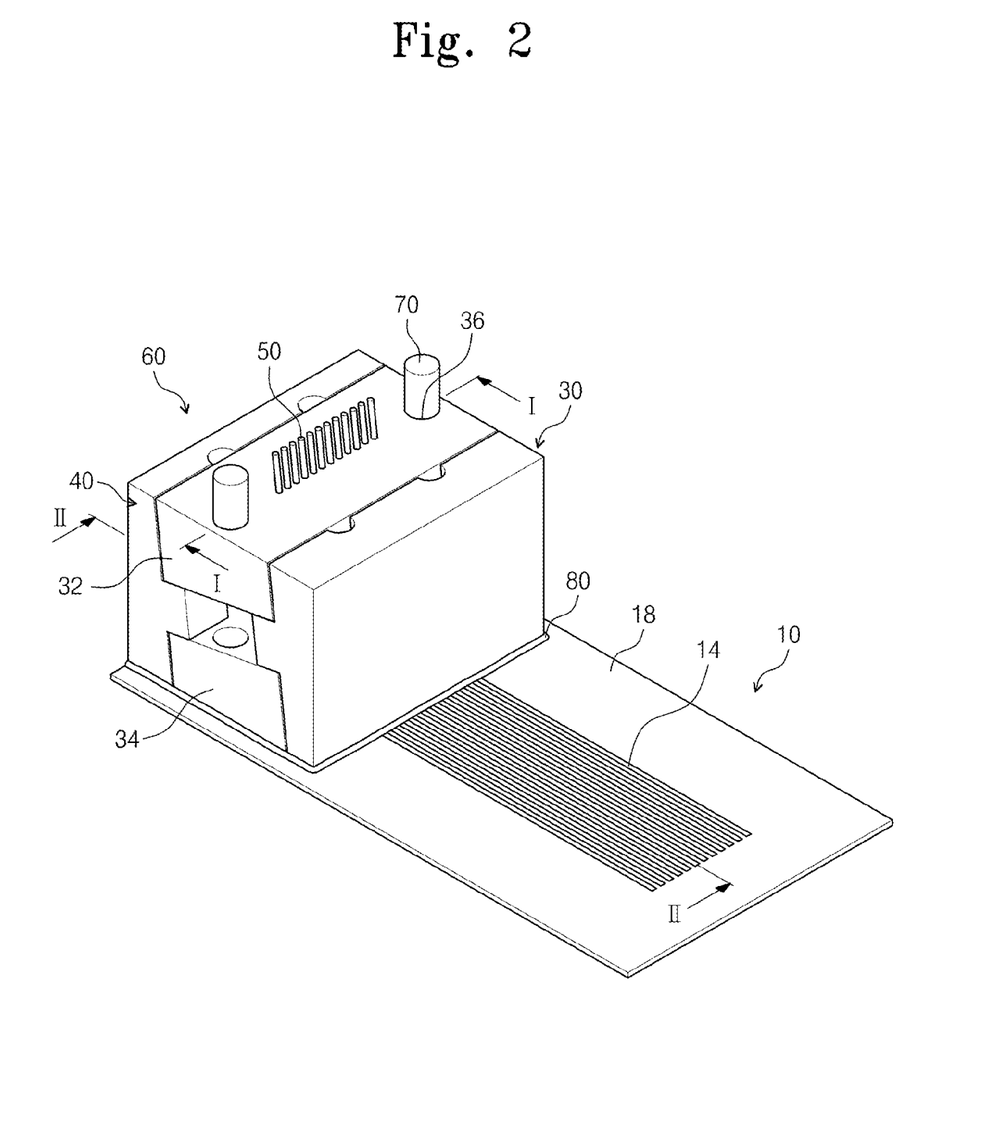

FIGS. 1 and 2 are exploded and assembled perspective views illustrating an optical apparatus according to an embodiment of the present invention.

Referring to FIGS. 1 and 2, an optical apparatus according to an embodiment of the present invention may include a photonics chip 10 including a plurality of alignment units 20 which align an optical connector 60 at both sides of optical waveguides 14 on a substrate 12. Each of the alignment units 20 may include a solder ball 22 and a pad 24. The solder balls 22 may be inserted into second holes 36 of ferrules 30 in the optical connector 60. Optical fibers 50 may be connected to optical couplers 16 formed in the optical waveguides 14.

Accordingly, the optical apparatus according to an embodiment of the present invention can increase alignment efficiency and optical bonding efficiency.

Figure 3:
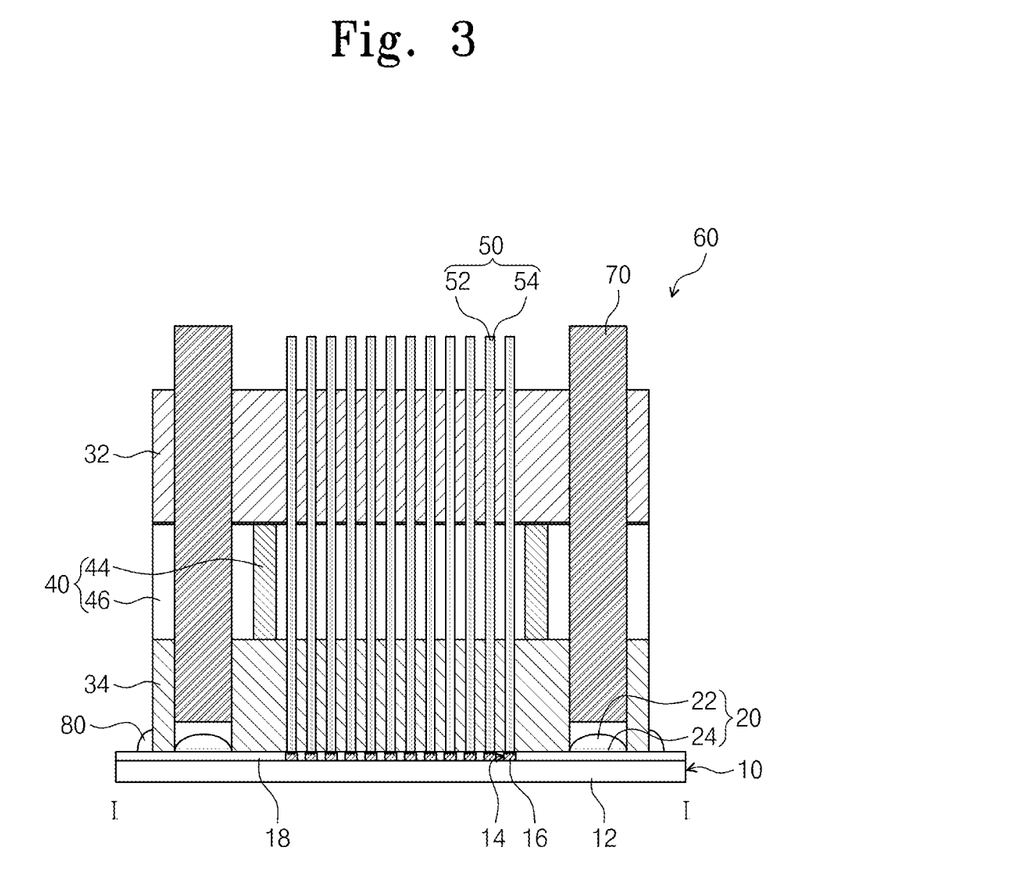
FIGS. 3 and 4 are sectional views taken along lines I-I' and II-II' of FIG. 2.
Figure 4:
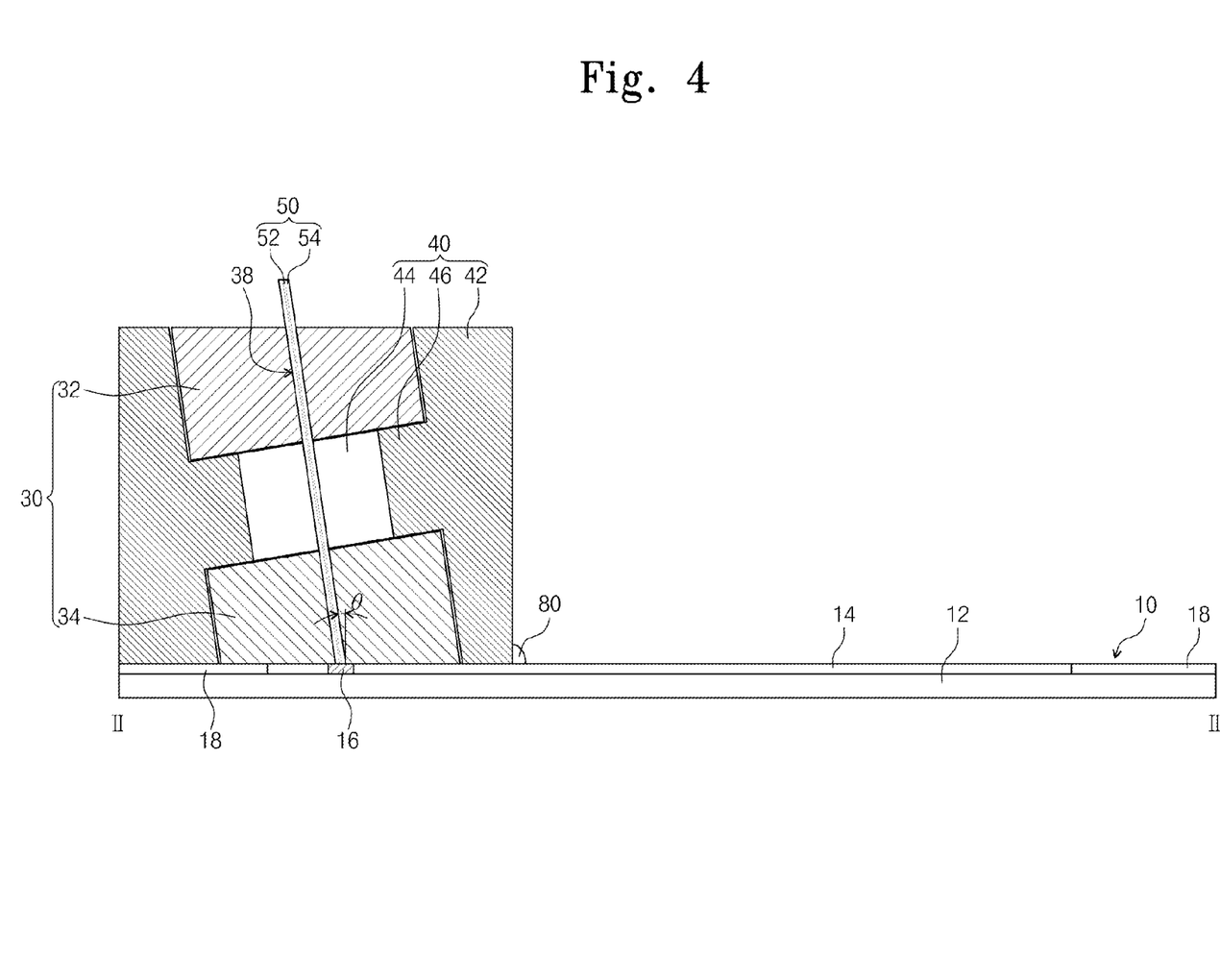

FIGS. 3 and 4 are sectional views taken along lines I-I' and II-II' of FIG. 2.

Referring to FIGS. 1 to 4, a photonics chip 10 may include a substrate 12, a plurality of parallel optical waveguides 14 on the substrate 12, and optical couplers 16 coupling optical fibers 50 to the optical waveguides 14. The substrate 12 may include a flat plate such as a glass substrate, a single crystal silicon wafer, or a silicon on insulation (SOI) wafer.

The optical waveguides 14 may deliver optical signals which are input/output through the optical fibers 50 to outside. The optical waveguides 14 may include ridge-type optical waveguides projecting onto the substrate 12. The optical waveguides 14 may be disposed planarly with a clad 18 on the substrate 12. The optical waveguides 14 may include single crystal silicon which has a refractive index higher than the clad 18.

Each of the optical couplers 16 may include a grating coupler. The grating coupler may include a plurality of linear, mesh-shaped, or concentric grooves formed on the optical waveguides 14 contacting the optical fibers 50. Although not shown, the photonics chip 10 may include a single integrated element including at least one of a diode, a sensor, a semiconductor optical amplifier, an optical modulator, a multiplexer, and a de-multiplexer. The diode, sensor, semiconductor optical amplifier, optical modulator, multiplexer, and de-multiplexer may be connected to the optical waveguides 14, on the substrate 12.

A plurality of alignment units 20 may be disposed at both sides of the optical couplers 16. For example, the plurality of alignment units 20 and the optical couplers 16 may be disposed on the same line. The plurality of alignment units 20 may be disposed perpendicularly to the optical waveguides 14. The optical waveguides 14 and the optical couplers 16 may be disposed at an equal distance between the plurality of alignment units 20. The plurality of alignment units 20 may be coupled to second holes 36 of the optical connector 60. As described above, the plurality of alignment units 20 may include a pad 24, and a solder ball 22 formed on the pad 24. The pad 24 can bond the solder ball 22 to the substrate 12 or the clad 18 on the substrate 12. The pad 24 may include a metal. The solder ball 22 may include a solder.

A plurality of optical fibers 50 may be fixed by the optical connector 60. The optical connector 60 may include ferrules 30 aligning the optical fibers 50, and a block 40 fixing the ferrules 30. The ferrules 30 may include an upper ferrule 32 and a lower ferrule 34. The ferrules 30 may include parallelepipeds. The ferrules 30 may include stainless steels, polymers, or ceramics. The ceramics may include aluminium or zirconium oxide. The ferrules 30 may include at least one first hole 38 through which the optical fibers 50 pass. The first holes 38 may include through-holes having the same caliber in the upper and lower ferrules 32 and 34. The first holes 38 may be formed in the same direction in the upper and lower ferrules 32 and 34.

The optical fibers 50 may be bonded to be inclined at a certain angle or perpendicular to the optical waveguides 14. The optical fibers 50 may be disposed perpendicularly to a direction intersecting the plurality of alignment units 20. On the other hand, the optical fibers 50 may be disposed to be inclined in a direction in which the optical waveguides 14 are extended. For example, the optical fibers 50 may irradiate light to the optical waveguides 14 and optical couplers 16 at an incident angle Θ of about 0 to about 50 degrees so as to minimize return loss. That is, the optical fibers 50 may be bonded to the optical couplers 16 to be inclined at about 90 to about 50 degrees from a flat surface of the substrate 12. The optical fibers 50 may include a core 52 and a cladding 54 surrounding the core 52.

The second holes 36 into which the alignment units 20 or guide pins 70 are inserted may be disposed outside the first holes 38. The guide pins 70 may align another optical connector or photoelectric device which is connected onto the optical connector 60. The guide pins 70 may be formed in a shaft or wedge shape. The second holes 36 may include through-holes which have the calibers greater than those of the first holes 38. The second holes 36 may be formed perpendicularly to the substrate 12. Accordingly, the first holes 38 may be inclined with respect to the second holes 36. The second holes 36 may be formed symmetrically at both edges of the ferrules 30. The second holes 36 of the upper ferrule 32 and the second holes 36 of the lower ferrule 34 may have the same size.

The guide pins 70 may pass through the second holes 36 of the upper ferrules 32. The alignment units 20 may be inserted into the second holes 36 of the lower ferrules 34. Accordingly, the second holes 36 of the upper and lower ferrules 32 and 34 may have different sizes according to diameters of the alignment units 20 and the guide pins 70.

Figure 5:
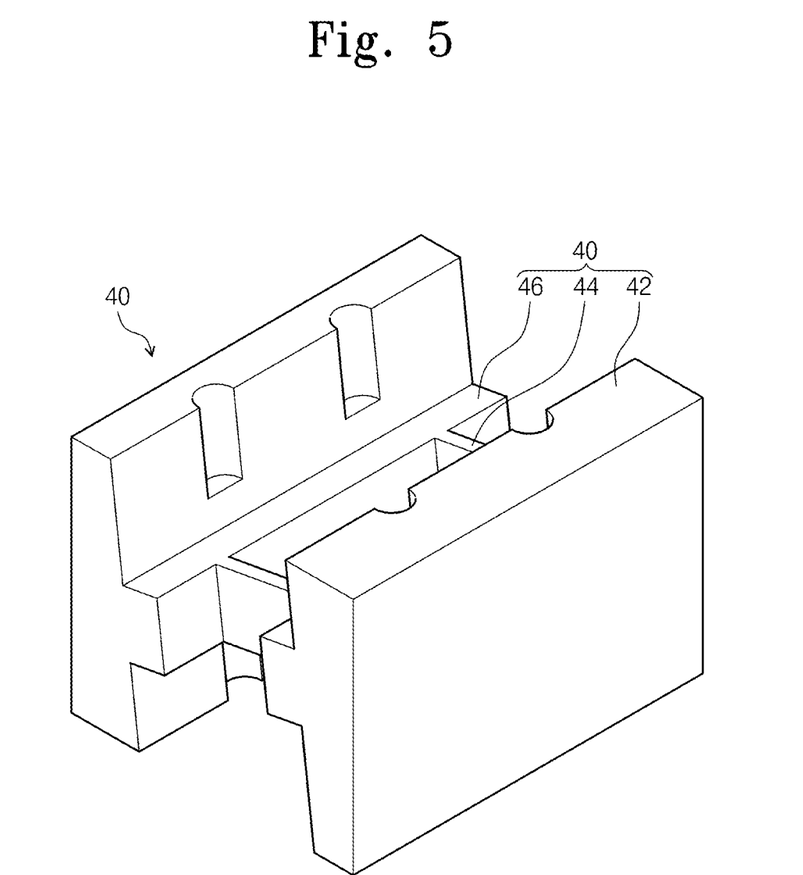
FIGS. 5 and 6 are a perspective view and side view of a block.
Figure 6:
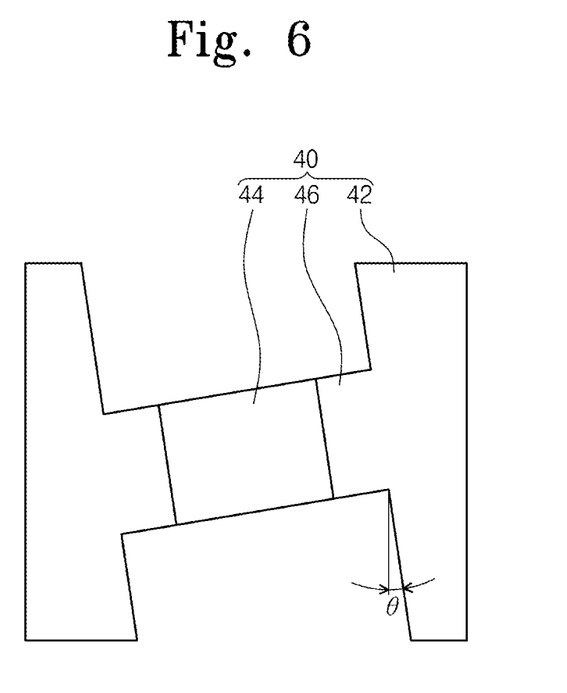

FIGS. 5 and 6 are a perspective view and side view of a block.

Referring to FIGS. 3 to 6, a block 40 may fix the ferrules 30 at a certain angle on the substrate 12. Further, the block 40 may fix the upper ferrule 32 and the lower ferrule 34 in parallel to each other. For example, the block 40 may include a plurality of housing frames 42 formed at both sides of the respective upper and lower ferrules 32 and 34, a plurality of connection frames 44 connecting the housing frames 42, and a plurality of ferrule fixing frames 46 fixing the upper and lower ferrules 32 and 34.

The housing frames 42 may be disposed perpendicularly to the substrate 12. The housing frames 42 may dispose the upper and lower ferrules 32 and 34 to be inclined from the substrate 12. The upper and lower ferrules 32 and 34 may be inclined in the same direction as the incident angle Θ of the optical fibers 50 by the housing frames 42. Upper and lower portions of the housing frames 42 may be symmetrical to each other. For example, if one of the housing frames has a relatively greater upper portion, the other may have a relatively less upper portion. The plurality of housing frames 42 may have the same horizontal surface as internal ferrules 30. This is because the plurality of housing frames 42 and the upper and lower ferrules 32 and 34 may be polished together.

The connection frames 44 may be disposed between the housing frames 42 at both sides of the ferrules 30. The connection frames 44 may fix the housing frames 42. The connection frames 44 may be inclined obliquely on the substrate 12. For example, the connection frames 44 may be inclined in the same direction as the upper and lower ferrules 32 and 34. The optical fibers 50 may be disposed between the connection frames 44.

The upper ferrule 32 and the upper ferrule 34 may be vertically separated from each other at an equal distance about the ferrule fixing frames 46. The ferrule fixing frames 46 may project into the housing frames 42. The ferrule fixing frames 46 may support edges of the respective upper and lower ferrules 32 and 34. The ferrule fixing frames 46 may separate the upper ferrule 32 from the lower ferrule 34 in parallel. The ferrule fixing frames 46 may be formed in the same direction as the connection frames 44. For example, the connection frames 44 and the ferrule fixing frames 46 may have a slope corresponding to an incident angle of the optical fibers 50 with respect to the substrate 12. The connection frames 44 and the ferrule fixing frames 46 may be inclined at the same angle as the upper and lower ferrules 32 and 34 from the housing frames 42.

Accordingly, the block 40 may fix the plurality of ferrules 30 in parallel and dispose the ferrules 30 at a certain slope on the substrate 12. The optical fibers 50 and the optical couplers 16 may be bonded to each other. The photonics chip 10 and the optical connector 60 may be aligned by the solder balls 22 and the second holes 36. After alignment and bonding of the photonics chip 10 and optical connector 60, the solder balls 22 may be bonded to the lower ferrule 34 of the optical connector 60 at a high temperature. The optical connector 60 can be fixed to the photonics chip 10 with an adhesive 80. The adhesive may include an epoxy.

As a result, an optical apparatus according to an embodiment of the present invention can increase and maximize optical alignment efficiency and optical bonding reliability.

Figure 7:
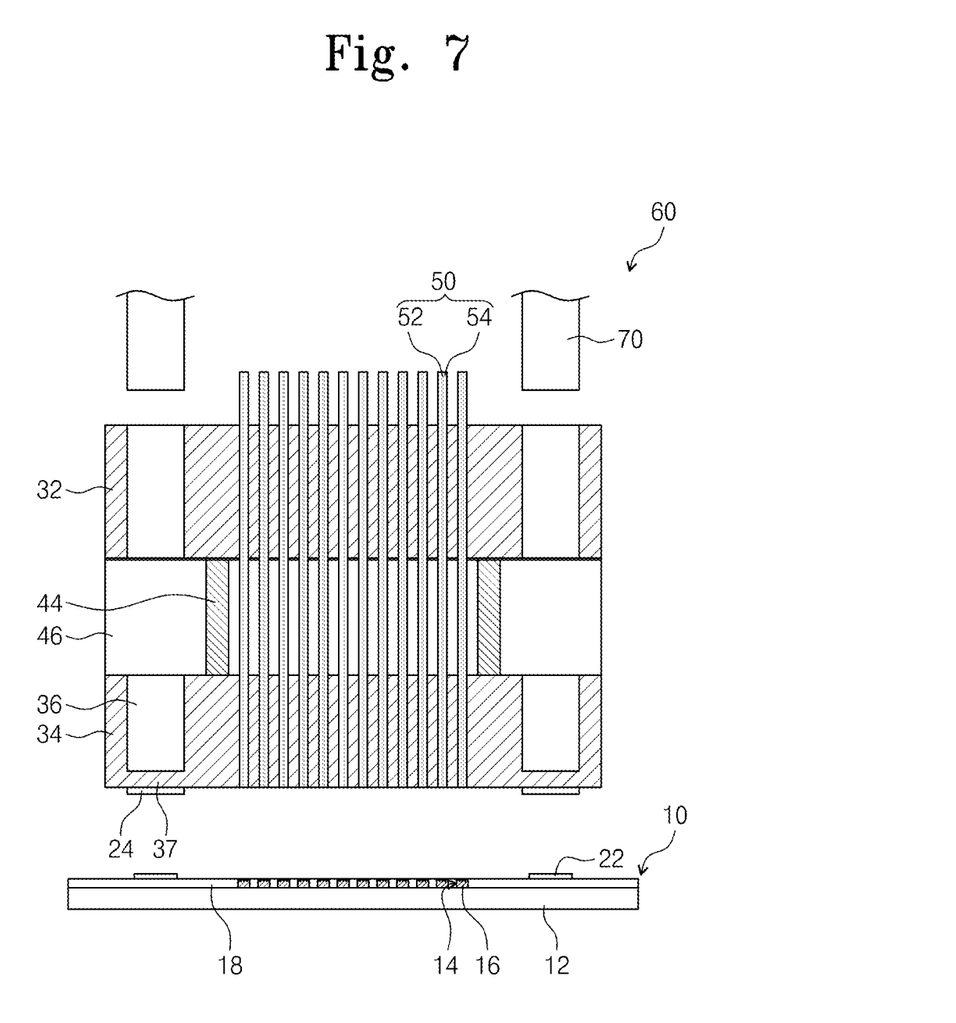
FIGS. 7 and 8 are exploded and assembled sectional views illustrating an optical apparatus according to another embodiment of the present invention.
Figure 8:
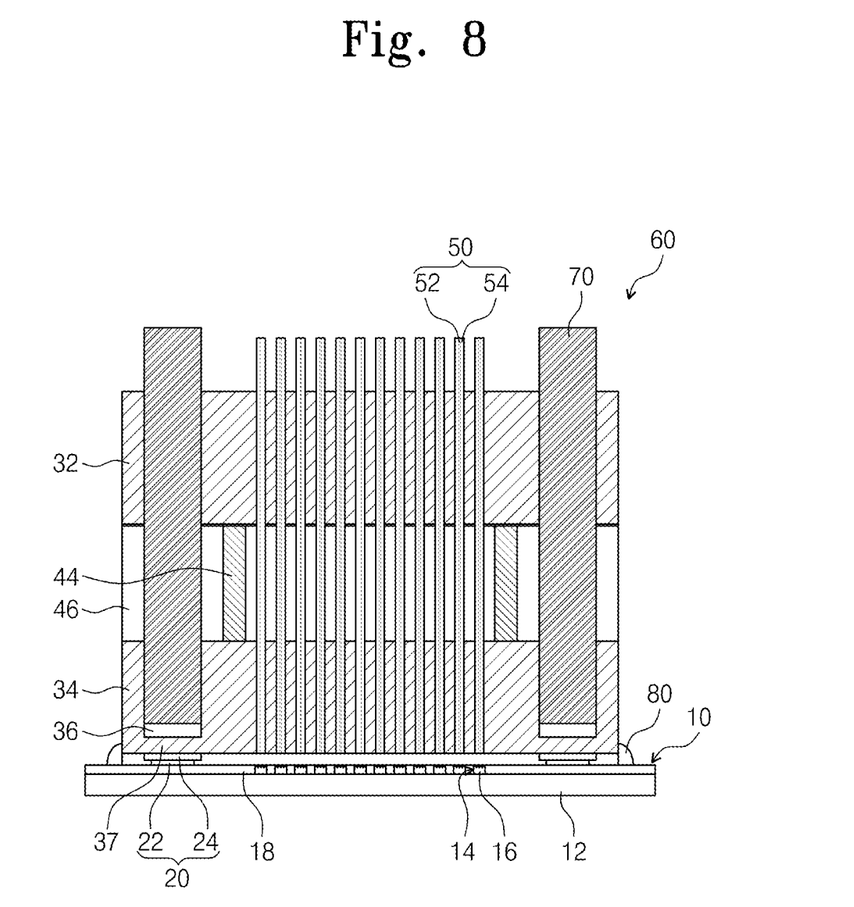

FIGS. 7 and 8 are exploded and assembled sectional views illustrating an optical apparatus according to another embodiment of the present invention.

Referring to FIGS. 7 and 8, an optical apparatus according to another embodiment of the present invention may include a photonics chip 10 including solder balls 22 formed at both sides of optical waveguides 14, and an optical connector 60 including pads 24 under ferrules 30 which align optical fibers 50 bonded to the optical waveguides 14.

The photonics chip 10 may be flip-chip bonded to the optical connector 60. The photonics chip 10 may include a single integrated element including at least one of a diode, a sensor, a semiconductor optical amplifier, an optical modulator, a multiplexer and a de-multiplexer which are connected to the optical waveguides 14 on the substrate 12. The solder balls 22 may be disposed outside the optical waveguides 14. The solder balls 22 may be disposed on a clad 18 of the photonics chip 10. Accordingly, the solder balls 22 may be exposed on the substrate 12 of the photonics chip 10.

The optical connector 60 may include ferrules 30 which include first holes 38 aligning the optical fibers 50 and second holes 36 formed outside the first holes 38. The ferrules 30 may include upper and lower ferrules 32 and 34. The ferrules 30 may be fixed by the block 40. The guide pins 70 which fix an optical apparatus connected to the optical connector 60 may be inserted into the second holes 36. The second holes 36 may pass through the upper ferrule 32. The second holes 36 may be formed at an upper portion of the lower ferrule 34. The lower ferrule 34 may have a flat surface supporting the pads 24 on a bottom thereof. The second holes 36 may not pass through the lower ferrule 34. The second holes 36 may include a trench blocked by the flat surface of the lower ferrule 34. Accordingly, the pads 24 may be supported at the lower ferrule 34 of the optical connector 60.

The pads 24 and the solder balls 22 may be included in alignment units 20 of the photonics chip 10 and optical connector 60. The pads 24 and the solder balls 22 may be bonded after alignment of the photonics chip 10 and optical connector 60. The photonics chip 10 and the optical connector 60 may be fixed with an adhesive 80. The optical fibers 50 and the optical couplers 16 may be bonded to each other. The optical fibers 50 and the optical couplers 16 may be separated from each other. An air gap 26 may exist between the optical fibers 50 and the optical couplers 16.

Accordingly, the optical apparatus according to another embodiment of the present invention can increase and maximize optical bonding reliability.

According to the embodiments of the present invention, as described above, the plurality of solder balls projecting onto the substrate are inserted into the holes of an optical connector, thereby increasing alignment efficiency of the photonics chip and optical connector. Furthermore, optical bonding reliability for the optical fiber and the optical coupler formed in the optical waveguides of the photonics chip can increase.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A photonics chip comprising:
   a substrate having a surface;
   an optical waveguide formed on the surface of the substrate;
   at least one optical coupler formed on the optical waveguide; and
   a plurality of alignment units provided on the surface of the substrate,
   wherein the plurality of alignment units align the optical waveguide with an optical connector, which fixes at least one optical fiber, on the substrate, and
   wherein at least one optical fiber is coupled to a corresponding optical coupler.

2. The photonics chip of claim 1, wherein the alignment units comprise a plurality of solder balls formed on the substrate.

3. The photonics chip of claim 2, wherein the solder balls are formed at both sides of the optical coupler.

4. The photonics chip of claim 3, wherein the solder balls and the optical couplers are formed on the same line.

5. The photonics chip of claim 4, wherein the optical connector comprises a plurality of holes into which the solder balls are inserted.

6. The photonics chip of claim 2, wherein the alignment units further comprise a plurality of pads disposed in at least one of an upper portion and lower portion of the solder balls.

7. An optical apparatus comprising:
an optical fiber;
an optical connector fixing the optical fiber, the optical connector having a plurality of first holes and a plurality of second holes; and
a photonics chip comprising:
 a substrate having a surface;
 an optical waveguide formed on the surface of the substrate;
 at least one optical coupler formed on the optical waveguide; and
 a plurality of alignment units provided on the surface of the substrate, aligning the optical connector on the substrate;
wherein the optical fiber passes through the first holes, the first holes being inclined at an angle of 0 to 50 degrees with respect to a direction perpendicular to the surface of the substrate; and
wherein the alignment units are inserted into the second holes, the second holes being perpendicular to the surface of the substrate.

8. The optical apparatus of claim 7, wherein the optical connector comprises at least one ferrule aligning the optical fiber, and a block surrounding the at least one ferrule.

9. The optical apparatus of claim 8, wherein the at least one ferrule comprises an upper ferrule and a lower ferrule.

10. The optical apparatus of claim 9, wherein each of the upper and lower ferrules comprises the plurality of first holes and the plurality of second holes formed outside the first holes.

11. The optical apparatus of claim 7, further comprising a plurality of guide pins inserted into the second holes on the alignment units.

12. The optical apparatus of claim 11, wherein the second holes comprise a trench into which the guide pins are inserted at an upper portion of the lower ferrule.

13. The optical apparatus of claim 12, wherein the lower ferrule has a flat surface supporting the alignment units at a lower portion of the second holes.

14. The optical apparatus of claim 13, wherein the photonics chip and the optical connector are flip-chip bonded by the alignment units.

15. The optical apparatus of claim 10, wherein the block fixes the upper and lower ferrules in parallel.

16. The optical apparatus of claim 15, wherein the block comprises a plurality of housing frames fixing the upper and lower ferrules to be inclined with respect to the substrate, a plurality of connection frames connecting the housing frame, and a plurality of ferrule fixing frames supporting the upper and lower ferrules in the housing frames.

17. The optical apparatus of claim 16, wherein the ferrule fixing frames separate the upper ferrule from the lower ferrule in parallel.

* * * * *